United States Patent
Peutl et al.

(10) Patent No.: US 9,187,263 B2
(45) Date of Patent: Nov. 17, 2015

(54) CLAMPING UNIT FOR CONTAINERS AT CONTAINER HANDLING MACHINES

(71) Applicant: KRONES AG, Neutraubling (DE)

(72) Inventors: August Peutl, Wörth (DE); Andreas Kraus, Lappersdorf (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/465,041

(22) Filed: Aug. 21, 2014

(65) Prior Publication Data

US 2015/0060240 A1    Mar. 5, 2015

(30) Foreign Application Priority Data

Sep. 4, 2013   (DE) .......................... 10 2013 217 657

(51) Int. Cl.
| | |
|---|---|
| *B65G 47/252* | (2006.01) |
| *B65G 47/86* | (2006.01) |
| *B65C 9/04* | (2006.01) |
| *B65C 3/26* | (2006.01) |
| *B41J 3/407* | (2006.01) |

(52) U.S. Cl.
CPC ............. *B65G 47/847* (2013.01); *B41J 3/4073* (2013.01); *B65C 3/26* (2013.01); *B65C 9/04* (2013.01)

(58) Field of Classification Search
CPC .... B65G 47/244; B65G 47/252; B65G 29/00; B65C 1/00; B65B 35/58; B65B 43/60
USPC ............. 198/379, 377.08; 156/556, 497, 499; 73/865.8; 141/98; 33/522
See application file for complete search history.

(56) References Cited

U.S. PATENT DOCUMENTS

| | | | |
|---|---|---|---|
| 1,978,002 A | 10/1934 | Weaver | |
| 3,410,377 A | 11/1968 | Riedel et al. | |
| 3,559,702 A | 2/1971 | Riesenberg | |
| 4,024,896 A | 5/1977 | Ishioka et al. | |
| 4,253,904 A | 3/1981 | Jodrey et al. | |

(Continued)

FOREIGN PATENT DOCUMENTS

| | | |
|---|---|---|
| DE | 2726822 A1 | 10/1991 |
| DE | 4035998 C2 | 2/1996 |

(Continued)

OTHER PUBLICATIONS

European Search Report for application No. EP 14 17 8483, dated Jan. 16, 2015.
Search report for DE 10 2013 217 657.0, dated Mar. 28, 2014.

*Primary Examiner* — James R Bidwell
(74) *Attorney, Agent, or Firm* — Marshall, Gerstein & Borun LLP

(57) ABSTRACT

A clamping unit for containers at container treatment machines where, apart from a vertically movable lifting arm with a centering support for clamping a container from above, a motor for driving the lifting arm and a pneumatic spring against the resistance of which the centering support is mounted at the lifting arm so as to be movable to the top are provided. The lifting arms may be set to a desired vertical position independently of the movement or the rotational position of an associated rotary machine, and a clamping force of the centering supports may be easily and flexibly adjusted by applying a suited pressure to the pneumatic spring.

14 Claims, 2 Drawing Sheets

(56) References Cited

U.S. PATENT DOCUMENTS

| | | | |
|---|---|---|---|
| 4,405,403 A | 9/1983 | Jodrey | |
| 4,723,648 A * | 2/1988 | Hamatani | 198/379 |
| 5,239,878 A | 8/1993 | Orlandi | |
| 6,321,814 B1 * | 11/2001 | Tracy et al. | 156/556 |
| 7,921,980 B2 * | 4/2011 | Eder et al. | 198/379 |
| 2002/0166640 A1 | 11/2002 | Caprara et al. | |
| 2006/0000299 A1 | 1/2006 | Leroux et al. | |
| 2011/0233838 A1 | 9/2011 | Kramer et al. | |
| 2011/0253506 A1 | 10/2011 | Kramer et al. | |
| 2013/0160405 A1 | 6/2013 | Preckel et al. | |

FOREIGN PATENT DOCUMENTS

| | | |
|---|---|---|
| DE | 20019839 U1 | 2/2001 |
| DE | 60208736 T2 | 9/2006 |
| DE | 102008013380 A1 | 9/2009 |
| DE | 102009005180 A1 | 7/2010 |
| DE | 102009005181 A1 | 7/2010 |
| DE | 102009003649 A1 | 9/2010 |
| DE | 102009025907 A1 | 12/2010 |
| DE | 102010044244 A1 | 3/2012 |

\* cited by examiner

CLAMPING UNIT FOR CONTAINERS AT CONTAINER HANDLING MACHINES

CROSS-REFERENCE TO RELATED APPLICATION

The present application claims priority to German Application No. 10 2013 217 657.0, filed Sep. 4, 2013. The priority application, DE 10 2013 217 657.0 is hereby incorporated by reference.

FIELD OF THE DISCLOSURE

The disclosure relates to a clamping unit for containers at container handling machines and to a container handling machine, in particular for directly printing onto containers, with several clamping units.

BACKGROUND

During the processing in container handling machines, in particular in rotary machines, for example in labeling or printing, containers, for example beverage bottles or the like, are usually retained in peripherally uniformly distributed clamping units on a carousel which is driven continuously or discontinuously. To adjust the rotational positions of the containers with respect to the circular path of the carousel, the containers are preferably placed onto rotary plates and pressed downwards by a centering support, for example a centering bell, in the mouth region or the closing region. On the one hand, one has to take care here that the clamping force is sufficiently high so that a correct position of the containers in the clamping units remains ensured despite laterally acting forces, for example centrifugal forces and/or pressing forces or the like caused by the processing. On the other hand, maximum values of the clamping force must be observed, depending on the mechanical stability of the containers, to avoid an undesired deformation and/or damage of the containers.

It is well-known that suited clamping forces can be generated by mechanical pressure springs. In particular in the processing of empty plastic bottles, an additional stabilization of the containers, in particular during labeling, by applying an overpressure inside the container has proven successful. To lift the centering supports during the supply/removal of the containers to/from the rotary machine to a suited position, stationary stroke curves along which the centering units are running are usually employed.

A disadvantage of the above prior art consists in that the clamping force of mechanical pressure springs is fixed. If different container types which differ, for example, by their material properties, wall thicknesses or sizes, are to be processed in the rotary machine, such predetermined clamping forces are not suited or only suited to a certain degree. The clamping units must be consequently modified which is elaborate. Another disadvantage consists in the vertical position of the centering supports depending on the current location of the respective clamping unit at a section of the stroke curve. Therefore, when the rotary machine is standing still, the centering units cannot be lifted/lowered for a certain measure.

Therefore, there is a demand for clamping units for containers at rotary machines in which at least one of the above disadvantages is eliminated or at least attenuated.

SUMMARY OF THE DISCLOSURE

One aspect of the present disclosure is unit for containers that is, in particular, suited for directly printing onto the containers on rotary machines. The clamping unit comprises a lifting arm movable in the vertical direction with a centering support for clamping a container from above. The container is in particular a bottle, for example a beverage bottle or the like. According to the disclosure, the clamping unit furthermore comprises a motor for driving the lifting arm and a pneumatic spring against the resistance of which the centering support is added at the stroke so as to be movable to the top.

The motor is, for example, a stepper motor or a servomotor. The motor permits a stroke of the lifting arm independent of the rotational position of the respective rotary machine and the centering support fixed to it, in particular also when the rotary machine is standing still. For example, in case of a maintenance task and/or a production stoppage, containers may be selectively removed from individual clamping units. As an alternative, even in a discontinuous machine operation, a transfer/a clamping of the containers may be performed while the carousel is standing still.

The spring force of the pneumatic spring is provided by a cylinder space filled with gas, for example air, in particular compressed air. The resistance of the pneumatic spring is thus formed by compressing the cylinder space. The resistance of the pneumatic spring acting against the clamped container, corresponding to the clamping force, may be adjusted by the pressure prevailing in the cylinder space when the spring is not loaded. Thus, the spring force of the pneumatic spring may be flexibly adapted to different container types and/or treatment steps by adjusting the overpressure applied to it.

Preferably, the clamping unit according to the disclosure furthermore comprises a threaded spindle driven by the motor and a spindle nut firmly connected to the lifting arm or formed at the lifting arm. Thereby, the lifting arm may be particularly precisely moved to a lower clamping position in which a container is clamped by means of the pneumatic spring, and an upper transfer position in which the container may be inserted into the clamping unit or removed from it. The lifting arm is to this end preferably guided linearly in the vertical direction. As an alternative, the lifting motion may be effected by a linear direct drive.

Preferably, the clamping unit according to the disclosure comprises at least one pressure line via which compressed air may be applied to the pneumatic spring. The pneumatic spring may then be supplied from outside, in particular by a central compressed air distributor provided at the rotary machine. The cylinder space, however, could also be in principle closed, and its volume could be, in an unloaded state, adjustable, i. e. without a container being clamped. For example, the cylinder space could be first precompressed to an initial volume starting from ambient pressure, for example by means of a separate piston that is movable independent of the centering unit to generate an overpressure suited for the required spring force.

Preferably, the pneumatic spring is designed such that its resistance may be adapted depending on an air pressure applied to the pressure line. Thus, the clamping force may be adjusted particularly flexibly, quickly and precisely by means of the pneumatic spring.

Preferably, the pneumatic spring comprises a piston firmly connected to the lifting arm and a stroke cylinder that is connected to the centering support and is movable with respect to the piston. Then, for example, a compressed air conduit for supplying the cylinder space may be formed in the piston. A stroke cylinder sliding on a stationary piston may be designed to be essentially tubular in a constructively simple manner. At such a stroke cylinder, the centering support may be furthermore particularly advantageously mounted.

Preferably, the centering support is rotatably mounted at the pneumatic spring. This facilitates the orientation of the rotational position of the clamped container. As an alternative, the centering support may also have a separate compact rotary drive and thus may accomplish the orientation of the rotational position of the clamped container.

Preferably, at least one compressed air conduit for supplying compressed air, preferably filtered or sterile compressed air, into the container is formed in the centering support. By this, compressed air may be introduced into a clamped container to purposefully increase its mechanical resistance.

Preferably, the clamping unit furthermore comprises a console or a similar frame for mounting the lifting arm and the motor and for a modular assembly of the clamping unit at a container treatment machine, in particular a rotary machine. This means that the console in particular has a self-supporting design and the clamping unit may be fixed/replaced as preassembled module. For example, after the module has been fixed, one only has to connect supply lines, such as pressure hoses or the like, to the clamping unit. This permits the installation, maintenance and/or modification at rotary machines. In one embodiment, this console may moreover contain the rotary plate required for rotating the container and centering the bottom.

Preferably, the clamping unit then furthermore comprises a rotary plate mounted underneath the centering support at the console. The clamping station may then be particularly flexibly inserted at different handling machines.

Also disclosed is a container handling machine that, in particular, is a rotary machine for directly printing onto containers. Then, several clamping units according to the disclosure as well as rotary plates associated with the centering supports are present at the machine. For example, rotary machines may be operated in a continuous transport motion with a particularly high machine output. With the aid of the rotary plates, the containers may be positioned in a rotational position desired for the respective treatment step. As an alternative, these rotary machines could also be moved in cycles, in particular to temporarily position the containers stationarily in front of an associated treatment unit, for example a printer, for an equipment process. As an alternative to the rotary machine, straight/linear machines may be also used whose components may be disposed analogously to the rotary machine along its conveyor path.

Preferably, the container handling machine according to the disclosure furthermore comprises a compressed air distributor for applying compressed air to the pneumatic springs and/or the centering supports. This permits a central compressed air supply of the individual clamping units. Correspondingly, overpressures to be applied to the pneumatic springs and/or the centering supports may be easily centrally adjusted. To this end, central pressure reducers or the like may be provided. The compressed air distributor may then be connected, for example, to a central compressed air supply.

Preferably, the container handling machine according to the disclosure furthermore comprises a carousel for transporting the containers. The carousel is preferably designed such that it rotates continuously. However, discontinuous operation is also possible, i. e. with an alternation between container transport and container treatment when no transport takes place.

Preferably, the rotary plates are then directly mounted on the carousel, and the container handling machine comprises connecting elements by means of which the clamping units may be fixed to/released from the carousel without removing the rotary plates. The connecting elements are, for example, threaded joints, clamping mechanisms, undercuts or the like.

BRIEF DESCRIPTION OF THE DRAWINGS

A preferred embodiment of the disclosure is represented in the drawing. In the drawings.

DETAILED DESCRIPTION

Figure 1:
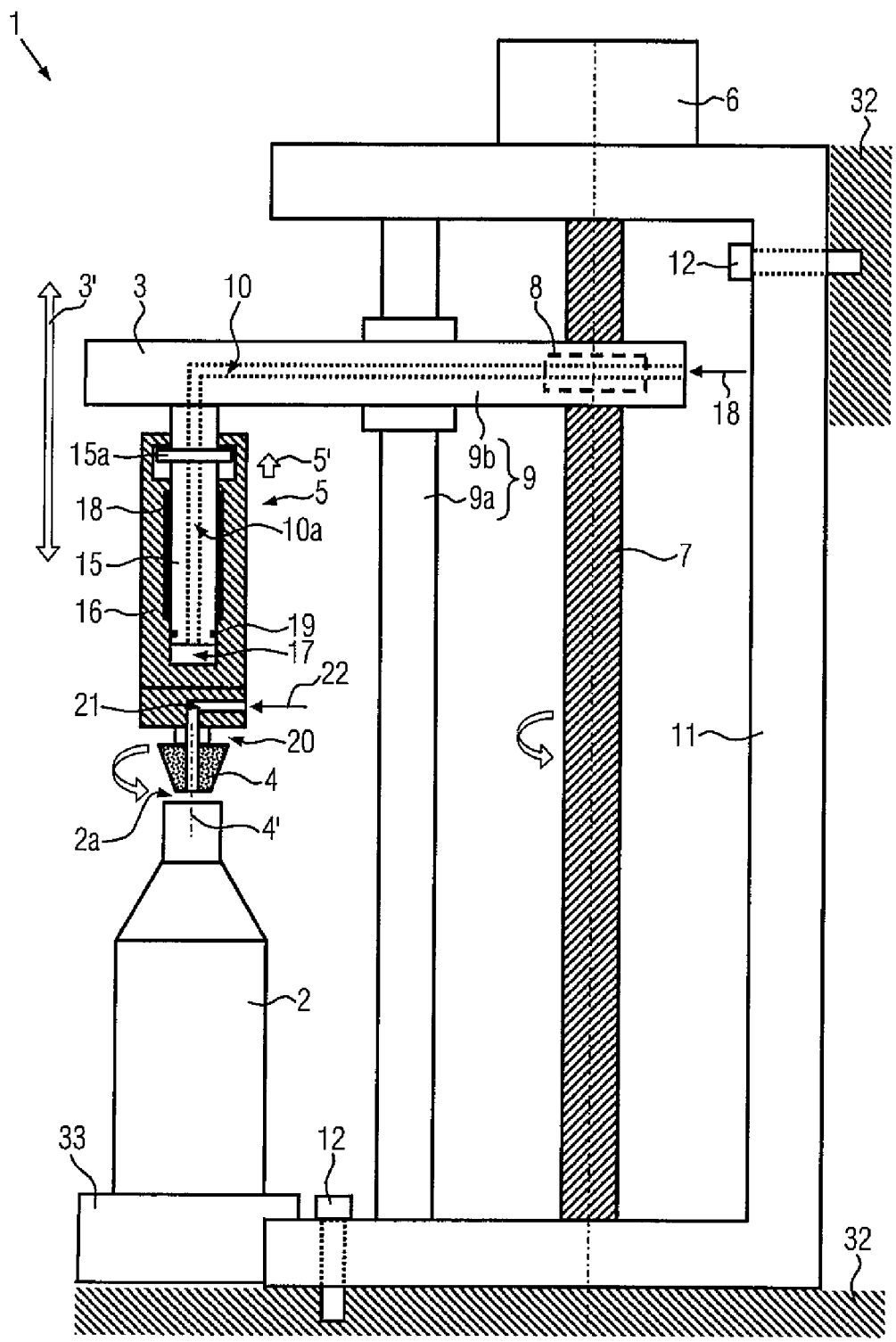
FIG. 1 shows a schematic side view of a modular clamping unit.

As can be seen in FIG. 1, a preferred embodiment of the disclosure clamping unit 1 for containers 2 comprises a lifting arm 3 which is movable in the vertical direction 3', in particular linearly, and which bears a centering support 4 preferably rotating about an axis 4' by means of which a container 2 may be clamped from above. The centering support 4 cooperates, for example, with the mouth region 2a of the container 2. The centering support 4 could also have a bell-like design to clamp a closed container from above by gripping over it (not represented).

The centering support 4 is spring-mounted at the lifting arm 3 in the vertical direction by means of a pneumatic spring 5. From the rest position of the centering support 4 shown in FIG. 1, in which it is not in contact with a container 2, the centering support 4 may perform a relative motion 5' with respect to the lifting arm 3 to the top against the resistance of the pneumatic spring 5. This is the case, for example, when the centering support 4 is lowered with the lifting arm 3 onto the container 2 and, after contact is made, the lifting arm 3 is further moved downwards for clamping the container 2.

A motor 6 is provided for driving the lifting arm 3, which is, for example, a servomotor or a stepper motor. The motor 6 drives a threaded spindle 7 which cooperates with a spindle nut 8 formed in the lifting arm 3 or firmly connected to the lifting arm 3. The lifting arm 3 is guided, for example, by a linear guide 9 with lifting rods 9a or the like and a slide 9b movably provided at them. A pressure line 10 is provided for supplying the pneumatic spring 5.

The clamping unit 1 according to the disclosure is preferably designed as a module and then furthermore comprises a console 11 or a similar frame for fixing the clamping unit 1 at a carousel 32. The console 11 is preferably self-supporting, so that the clamping unit 1 is fixed as preassembled module and/or may be exchanged without disassembling the clamping unit 1. The console 11 supports, for example, the threaded spindle 7, the motor 6 and the linear guide 9. At the console 11, fixing elements 12 are preferably provided, for example threaded joints, clamping pins, undercuts, or the like, which permit a positionally accurate and quick assembly of the clamping unit 1 at the carousel 32.

The pneumatic spring 5 preferably comprises a piston 15 firmly connected to the lifting arm 3 and a stroke cylinder 16 vertically movable relative to it, which, for example, projects in a tubular manner downwards over the internal piston 15. Compressed air of a first overpressure may be applied to a cylinder space 17 enclosed by the piston 15 and the stroke cylinder 16 via the pressure line 10. To this end, a conduit 10a may be formed, for example, in the piston 15. The spring action of the pneumatic spring 5 is based on the overpressure of the applied compressed air acting against a compression of the cylinder space 17. The relative stroke of the stroke cylinder 16 is, for example, limited by a stop 15a or a functionally equivalent mechanism formed at the piston 15.

In support of a precise sliding of the stroke cylinder 16 and the piston 15 one upon the other, a cylinder liner 18 is preferably integrated in the stroke cylinder 16. Furthermore, a sealing piston ring 19 and a bearing 20 by which the centering support 4 is rotatably fixed to the stroke cylinder 16, are schematically indicated.

In the centering support 4, a compressed air conduit 21 may be furthermore embodied by which compressed air 22 of a second overpressure may be fed into the interior of the container 2. In particular plastic containers may thus be blown up to an internal pressure suited for the respective treatment and/or for clamping. The compressed air conduit 21 could be connected to a pressure line 10' in the same manner as the pneumatic valve 5. Advantageously, separately adjustable overpressures for cushioning the centering support 4 and for inflating the associated container 2 are provided.

Figure 2:
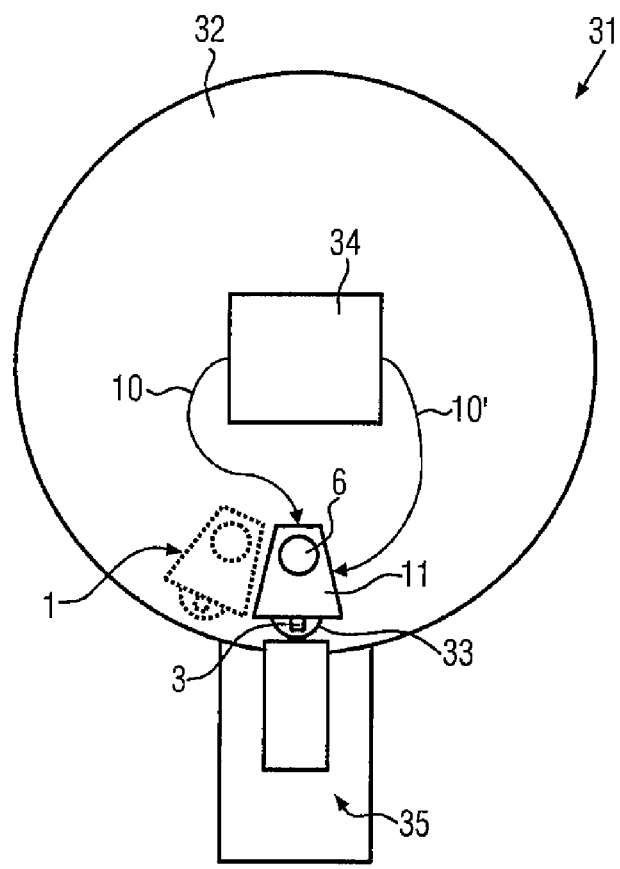
FIG. 2 shows a schematic plan view onto a rotary machine according to the disclosure.

FIG. 2 schematically illustrates a rotary machine-type container handling machine 31 according to the disclosure with an in particular continuously rotating carousel 32 on which several modular clamping units 1 are uniformly distributed and mounted by means of the fixing elements 12. For a better overview, FIG. 2 only indicates one further clamping unit in a dashed line. One rotary plate 33 or the like is each associated with the centering supports 4 of the clamping units 1 for clamping the containers 2. The clamping units 1 are preferably designed such that they may be replaced without removing the rotary plates 33 directly mounted at the carousel 32, for example in case of malfunctions or for modification purposes. Nonetheless, it would also be conceivable to fix the centering supports 4 to the pneumatic spring for a separate modification with a clutch for a quick replacement. Equally, the rotary plates 33 could be part of the modularly exchangeable clamping units 1 and to this end be mounted at the consoles 11, in particular together with respectively associated drive motors for the rotary plates 33.

FIG. 2 furthermore shows a central compressed air distributor 34 by which the pneumatic springs 5 and/or the centering supports 4 of the individual clamping units 1 may be supplied via the air conduits 10, 10'. Central pressure reducers or the like could be provided, for example, at the compressed air distributor 34 for separately adjusting the first overpressure in the cylinder spaces 17 and/or the second overpressure inside the containers 2. This permits a quick and flexible adaptation of the overpressures to respective treatment steps to be performed and/or container types.

The container handling machine 31 is preferably a machine for directly printing onto the containers 2. In this case, for example only schematically indicated pressure units 35 are stationarily docked to the periphery of the carousel 32.

The clamping units 1 according to the disclosure, however, are also suited for holding/positioning containers for other treatment steps, for example for labeling, inspecting, or the like. The clamping units 1 according to the disclosure may also be employed at stationary or discontinuously operated handling machines.

With the individually controllable motors 6, the lifting motions for clamping the containers 2 may be flexibly and quickly adapted to different container types. In particular, a complicated replacement of mechanical control cams when the container type to be treated is changed may be eliminated. Consequently, the production output and user friendliness of handling machines 32 according to the disclosure may be optimized.

The invention claimed is:

1. A clamping unit for containers at container handling machines, comprising:
   a lifting arm movable in the vertical direction with a centering support for clamping a container;
   a motor connected to the lifting arm for driving the lifting arm; and
   a pneumatic spring associated with the centering support, wherein:
   the pneumatic spring is connected to at least one pressure line via which compressed air is supplied to the pneumatic spring; and
   the pneumatic spring provides resistant force to the container with engaging the centering support to the container.

2. The clamping unit according to claim 1, and a threaded spindle driven by the motor and a spindle nut one of firmly connected to the lifting arm and embodied at the lifting arm.

3. The clamping unit according to claim 1, and the pneumatic spring is designed such that its resistance may be adjusted depending on an air pressure applied to the pressure line.

4. The clamping unit according to claim 1, the pneumatic spring comprising a piston firmly connected to the lifting arm, a stroke cylinder movable with respect to the lifting arm and connected with the centering support.

5. The clamping unit according to claim 1, and the centering support is rotatably mounted at the pneumatic spring.

6. The clamping unit according to claim 1, and at least one compressed air conduit is provided in the centering support for supplying compressed air into the container.

7. The clamping unit according to claim 1, and a console at which the lifting arm and the motor are mounted, and which is embodied for a modular assembly of the clamping unit at a container handling machine.

8. The clamping unit according to claim 7, and a rotary plate mounted underneath the centering support at the console.

9. A container handling machine, comprising:
   several clamping units wherein each clamping unit comprises a lifting arm movable in a vertical direction with a centering support for clamping a container;
   a motor connected to the lifting arm for driving the lifting arm;
   a pneumatic spring associated with the centering support, wherein the pneumatic spring provides a resistant force to the container with engaging the centering support to the container;
   a rotary plate for each clamping unit, wherein the rotary plate is associated with the centering supports and
   a compressed air distributor for applying compressed air to the pneumatic spring.

10. The container handling machine according to claim 9 and a carousel for transporting the containers.

11. The container handling machine according to claim 10, and the respective rotary plates are mounted on the carousel, and connecting elements by which the clamping units may be fixed to and released from the carousel without removing the rotary plates.

12. The clamping unit according to claim 1, and the container handling machines are for directly printing onto the containers.

13. The clamping unit according to claim 1, and the container comprises a bottle.

14. The container handling machine according to claim 9, and the container handling machine is for directly printing onto containers.

* * * * *